(12) United States Patent
Knoop et al.

(10) Patent No.: US 8,477,693 B1
(45) Date of Patent: Jul. 2, 2013

(54) OUT-OF SECTOR MESSAGE STREAM DELIVERY

(75) Inventors: Dale Russell Knoop, Leawood, KS (US); Bradley Allen Kropf, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 217 days.

(21) Appl. No.: 13/087,132

(22) Filed: Apr. 14, 2011

(51) Int. Cl.
*H04W 4/00* (2009.01)

(52) U.S. Cl.
USPC .............................. 370/328; 370/230; 370/465

(58) Field of Classification Search
USPC .............. 370/230, 230.1, 231, 235, 328–329, 370/335–336, 338, 342–343, 345, 400–401, 370/441–442, 465
See application file for complete search history.

(56) References Cited

U.S. PATENT DOCUMENTS

| | | | |
|---|---|---|---|
| 5,768,276 A | 6/1998 | Diachina et al. | |
| 5,909,651 A | 6/1999 | Chander | |
| 6,201,974 B1 | 3/2001 | Lietsalmi et al. | |
| 6,505,052 B1 | 1/2003 | Jou | |
| 6,522,877 B1 | 2/2003 | Lietsalmi et al. | |
| 6,606,502 B1 | 8/2003 | Chung Kam Chung | |
| 6,625,460 B1 | 9/2003 | Patil | |
| 7,397,773 B2 | 7/2008 | Qu et al. | |
| 7,720,475 B2 * | 5/2010 | McKenna et al. | 455/435.1 |
| 7,817,964 B2 * | 10/2010 | Patel et al. | 455/67.11 |
| 2002/0018450 A1 * | 2/2002 | McKenna et al. | 370/328 |
| 2004/0076131 A1 | 4/2004 | Qu et al. | |
| 2004/0203615 A1 | 10/2004 | Qu et al. | |
| 2005/0261012 A1 | 11/2005 | Weiser | |
| 2007/0281717 A1 | 12/2007 | Bharadwaj | |
| 2010/0142438 A1 * | 6/2010 | Chen et al. | 370/328 |
| 2011/0286389 A1 * | 11/2011 | Atarius et al. | 370/328 |

* cited by examiner

Primary Examiner — Kevin Mew

(57) ABSTRACT

A communication control system configures a wireless access node to broadcast a message stream comprising information associated with a location covered by a sector serving wireless communication devices, receives an interest indicator indicating a level of interest in the message stream by the wireless communication devices, receives a request to receive the message stream transmitted from an out-of-sector wireless communication device served by a different sector from the sector serving the wireless communication devices, wherein the request includes interest filter criteria, applies the interest filter criteria to activate a subscription to the message stream for the out-of-sector wireless communication device when the interest filter criteria is met based on the interest indicator, and in response to activating the subscription to the message stream, transfers a message comprising the information associated with the location covered by the sector serving the wireless communication devices for delivery to the out-of-sector wireless communication device.

20 Claims, 7 Drawing Sheets

OUT-OF SECTOR MESSAGE STREAM DELIVERY

TECHNICAL BACKGROUND

Continually increasing numbers of individuals are utilizing wireless communication devices to conduct mobile communications. In response to the prominence of modern wireless communication networks and the Warning, Alert, and Response Network (WARN) Act passed by Congress in 2006, the Federal Communications Commission has adopted a network structure, operational procedures, and technical requirements for the Commercial Mobile Alert System (CMAS). CMAS is an alerting network designed to aggregate emergency notifications from federal agencies and distribute these notification messages to participating wireless communication service providers. The wireless communication service providers may then broadcast these emergency notifications to wireless communication devices that are affected by the emergency.

To support CMAS, participating wireless communication service providers typically reserve a dedicated communication channel in each sector of a wireless access network for broadcasting emergency notifications to users located in each of the sectors. These reserved emergency broadcast channels are separate from the other communication channels and resources utilized to exchange typical user communications with wireless devices over the network, such as Internet access and voice communications. Reserving a dedicated emergency broadcast channel is necessary because user communications often increase during an emergency, which could prevent or delay the transmission of CMAS emergency notifications if the user communication channels were shared for such emergency broadcasts.

OVERVIEW

A method of operating a wireless communication system is disclosed. The method comprises, in a wireless access node, exchanging wireless communications with a plurality of wireless communication devices located in a sector served by the wireless access node to provide wireless internet access. The method further comprises, in a communication control system, configuring the wireless access node to broadcast a message stream comprising information associated with a location covered by the sector serving the wireless communication devices. The method further comprises, in the wireless access node, broadcasting the message stream to the wireless communication devices located in the sector. The method further comprises, in the communication control system, receiving an interest indicator that indicates a level of interest in the message stream by the wireless communication devices. The method further comprises, in the communication control system, receiving a request to receive the message stream transmitted from an out-of-sector wireless communication device served by a different sector from the sector serving the wireless communication devices, wherein the request includes interest filter criteria. The method further comprises, in the communication control system, applying the interest filter criteria to activate a subscription to the message stream for the out-of-sector wireless communication device when the interest filter criteria is met based on the interest indicator. The method further comprises, in the communication control system, in response to activating the subscription to the message stream, transferring a message for delivery to the out-of-sector wireless communication device, wherein the message comprises the information associated with the location covered by the sector serving the wireless communication devices.

A wireless communication system comprises a wireless access node and a communication control system. The wireless access node is configured to exchange wireless communications with a plurality of wireless communication devices located in a sector served by the wireless access node to provide wireless internet access. The communication control system is configured to configure the wireless access node to broadcast a message stream comprising information associated with a location covered by the sector serving the wireless communication devices. The wireless access node is further configured to broadcast the message stream to the wireless communication devices located in the sector. The communication control system is configured to receive an interest indicator that indicates a level of interest in the message stream by the wireless communication devices. The communication control system is further configured to receive a request to receive the message stream transmitted from an out-of-sector wireless communication device served by a different sector from the sector serving the wireless communication devices, wherein the request includes interest filter criteria. The communication control system is also configured to apply the interest filter criteria to activate a subscription to the message stream for the out-of-sector wireless communication device when the interest filter criteria is met based on the interest indicator. The communication control system is configured to, in response to activating the subscription to the message stream, transfer a message for delivery to the out-of-sector wireless communication device, wherein the message comprises the information associated with the location covered by the sector serving the wireless communication devices.

A communication control system comprises a processing system and a communication transceiver, wherein a wireless access node is configured to exchange wireless communications with a plurality of wireless communication devices located in a sector served by the wireless access node to provide wireless internet access. The processing system is configured to configure the wireless access node to broadcast a message stream comprising information associated with a location covered by the sector serving the wireless communication devices. The communication transceiver is configured to transfer the message stream for delivery to the wireless access node, receive an interest indicator that indicates a level of interest in the message stream by the wireless communication devices, and to receive a request to receive the message stream transmitted from an out-of-sector wireless communication device served by a different sector from the sector serving the wireless communication devices, wherein the request includes interest filter criteria. The processing system is configured to apply the interest filter criteria to activate a subscription to the message stream for the out-of-sector wireless communication device when the interest filter criteria is met based on the interest indicator. The communication transceiver is configured to, in response to activating the subscription to the message stream, transfer a message for delivery to the out-of-sector wireless communication device, wherein the message comprises the information associated with the location covered by the sector serving the wireless communication devices.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
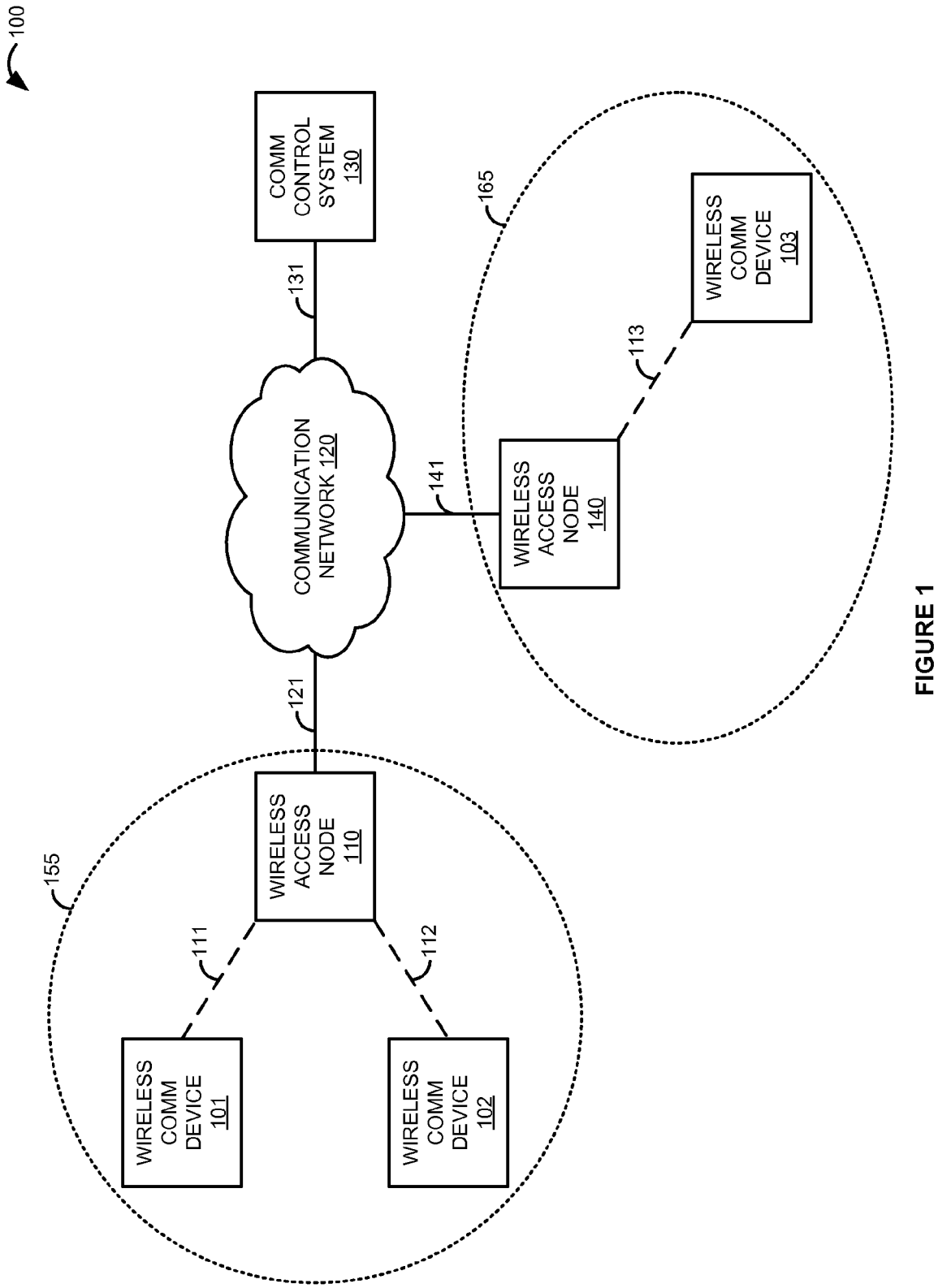
FIG. 1 is a block diagram that illustrates a communication system.

FIG. 1 is a block diagram that illustrates communication system 100. Communication system 100 includes wireless communication devices 101, 102, and 103, wireless access nodes 110 and 140, communication network 120, and communication control system 130. Wireless communication device 101 and wireless access node 110 are in communication over wireless communication link 111. Likewise, wireless communication device 102 and wireless access node 110 communicate over wireless communication link 112. Wireless access node 110 and communication network 120 are in communication over communication link 121. Wireless communication device 103 and wireless access node 140 are in communication over wireless communication link 113. Wireless access node 140 and communication network 120 are in communication over communication link 141. Communication network 120 and communication control system 130 communicate over communication link 131. Each of the wireless access nodes 110 and 140 have approximate wireless coverage areas as indicated by the dotted lines on FIG. 1, which are represented by respective sectors 155 and 165. In particular, wireless access node 110 provides a wireless coverage area of sector 155 which serves wireless communication devices 101 and 102, while wireless access node 140 provides a wireless coverage area of sector 165 serving wireless communication device 103.

Figure 2:
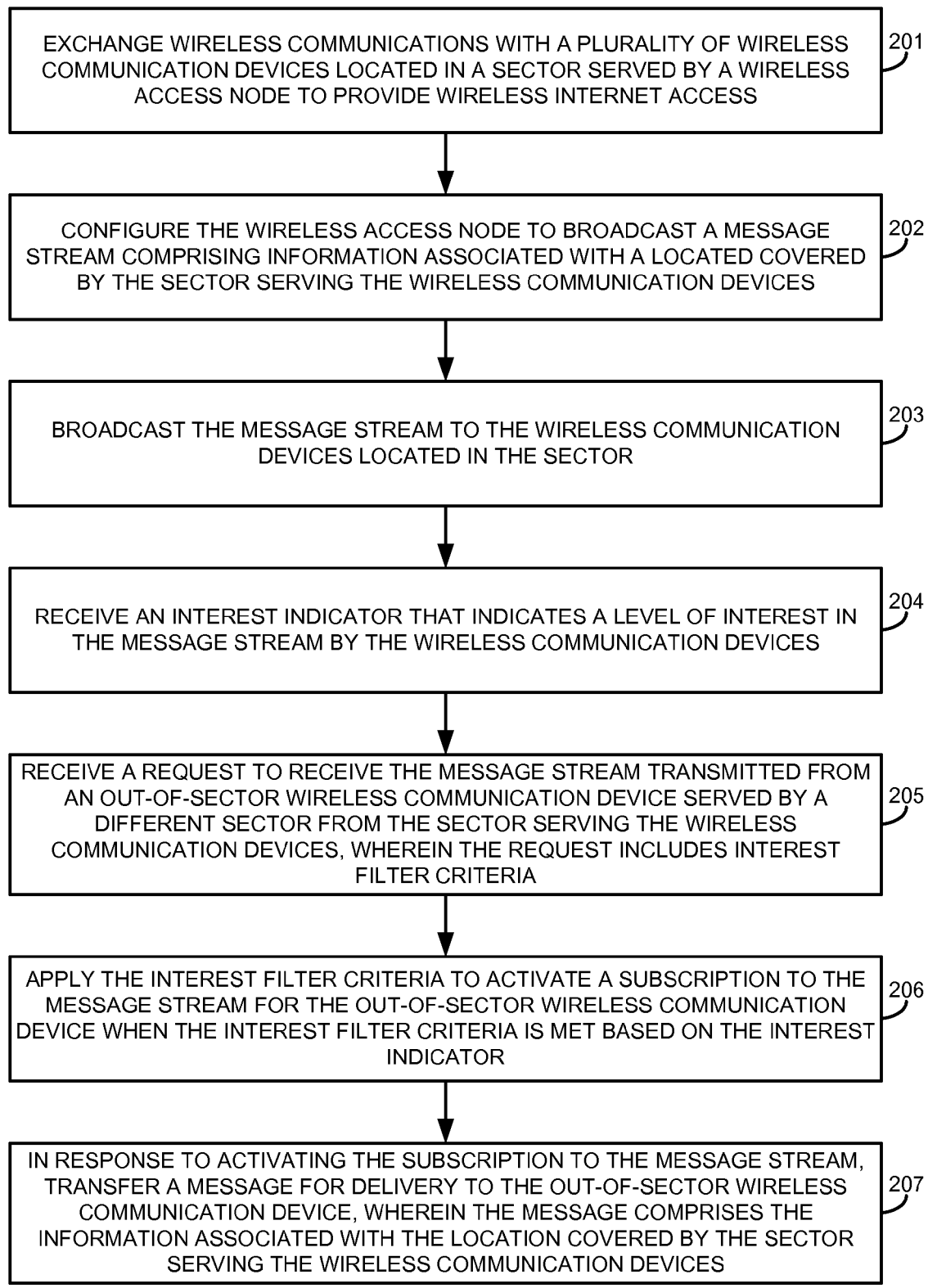
FIG. 2 is a flow diagram that illustrates an operation of the communication system.

FIG. 2 is a flow diagram that illustrates an operation of communication system 100. The steps of the operation are indicated below parenthetically. Initially, wireless access node 110 exchanges wireless communications with a plurality of wireless communication devices 101-102 located in a sector 155 served by wireless access node 110 to provide wireless internet access (201). The wireless communications exchanged between wireless access node 110 and wireless communication devices 101-102 could include both signaling messages and bearer communications. In some examples the wireless internet access provided by wireless access node 110 could comprise access to a telephony network for voice communications.

Communication control system 130 configures wireless access node 110 to broadcast a message stream comprising information associated with a location covered by the sector 155 serving the wireless communication devices 101-102 (202). Typically, wireless access node 110 broadcasts the message stream on a dedicated communication channel that is reserved for such broadcasts and is separate from the resources utilized by wireless access node 110 to exchange the wireless communications with wireless communication devices 101-102 to provide the wireless internet access. The information associated with the location covered by the sector 155 could comprise several types of information, such as local news, weather updates, traffic reports, sports results, advertisements, coupons, and other messages pertaining to the location served by sector 155. The information for the message stream could be provided by communication control system 130 or some other system in communication with communication network 120.

Wireless access node 110 broadcasts the message stream to the wireless communication devices 101-102 located in the sector 155 (203). Typically, the message stream comprises short message service (SMS) messaging, although other techniques of providing the message stream to wireless communication devices 101-102 could also be used, including customized messages tailored for a particular application executing on devices 101-102. In some examples, wireless access node 110 could utilize broadcast channel associated with a commercial mobile alert system (CMAS) to broadcast the message stream to the wireless communication devices 101-102.

Communication control system 130 receives an interest indicator that indicates a level of interest in the message stream by the wireless communication devices 101-102 (204). In some examples, wireless communication devices 101-102 may subscribe to the message stream or portions thereof by transferring a keyword, SMS short code, or some other indicator for delivery to communication control system 130 in order to opt-in to the message stream. The broadcast message stream could then include device and/or subscriber identifiers of the subscribing wireless communication devices 101-102 so that these subscribing devices 101-102 can receive and display the message stream. In this case, communication control system 130 could receive the interest indicator by receiving subscription requests transmitted from the wireless communication devices 101-102 when subscribing to the message stream, and could base the level of interest in the message stream on the quantity of the subscription requests. In other examples, wireless access node 110 could broadcast the message stream indiscriminately to all wireless communication devices 101-102 within the sector 155, and devices 101-102 could be configured to only display the message stream or portions thereof upon request from a user of device 101 or 102, such as when the user selects a particular message for display from a menu of available messages. In this case, wireless communication devices 101-102 could be configured to report which messages are accessed and displayed by their users. Communication control system 130 could thus receive the interest indicator by receiving usage metrics transmitted from the wireless communication devices 101-102 that indicate portions of the message stream displayed by the wireless communication devices 101-102.

Communication control system 130 receives a request to receive the message stream transmitted from an out-of-sector wireless communication device 103 served by a different sector 165 from the sector 155 serving the wireless communication devices 101-102 (205). Since wireless communication device 103 is not presently being served by sector 155 of wireless access node 110, wireless communication device 103 would not otherwise receive the information associated with the location covered by sector 155 being broadcast by wireless access node 110. Therefore, wireless communication device 103 actively requests to receive the message stream in order to receive the information associated with the location covered by sector 155 when device 103 is not at that location. In some examples, the request to receive the message stream could include an information type. For example, if the message stream comprises several types of information, such as local news, weather updates, traffic reports, sports results, advertisements, and coupons, the request to receive the message stream could specify only one of these information types. Additionally, the request could include further levels of granularity, such as only sports results pertaining to a specific team, or only advertisements from a particular company or for certain types of products and services. Typically, the request to receive the message stream would identify the location covered by the sector 155 serving the wireless communication devices 101-102. In some examples, the request to receive the message stream is submitted via an application executing on the out-of-sector wireless communication device 103, such as a web browser, SMS text messaging client, or an application specifically designed for submitting requests to receive broadcast message streams.

The request to receive the message stream also includes interest filter criteria (205). Typically, the interest filter criteria provides a threshold level of interest in the message stream and/or particular messages within the stream that should be met before out-of-sector wireless communication device 103 will receive the requested information included in the message stream. In some examples, the interest filter criteria could comprise a threshold quantity of the wireless communication devices 101-102 that are interested in the message stream based on the interest indicator. In other examples, the interest filter criteria could comprise a percent growth per day of the wireless communication devices 101-102 that are interested in the message stream based on the interest indicator. Other criteria and metrics related to the level of interest in the message stream by the wireless communication devices 101-102 are also possible.

Communication control system 130 applies the interest filter criteria to activate a subscription to the message stream for the out-of-sector wireless communication device 103 when the interest filter criteria is met based on the interest indicator (206). The subscription to the message stream could comprise only a particular message, information type, or portion of the message stream as discussed above with respect to the request to receive the message stream. Typically, the interest indicator and the interest filter criteria are provided in interchangeable units to facilitate comparison by communication control system 130 to determine when the interest filter criteria is met. Alternatively, communication control system 130 could convert the interest indicator and/or the interest filter criteria to render the units or metrics compatible. In some examples, communication control system 130 could apply the interest filter criteria to activate the subscription to the message stream for the out-of-sector wireless communication device 103 by determining the interest indicator as a quantity of the subscription requests received from the wireless communication devices 101-102, processing the interest indicator with the interest filter criteria to determine that the interest filter criteria is met, and responsively activating the subscription to the message stream for the out-of-sector wireless communication device 103.

In response to activating the subscription to the message stream, communication control system 130 transfers a message for delivery to the out-of-sector wireless communication device 103 (207). The message typically comprises the information associated with the location covered by the sector 155 serving the wireless communication devices 101-102 (207). In some examples, the information included in the message comprises the information type or particular message to which the out-of-sector wireless communication device 103 subscribed in the request to receive the message stream. Typically, communication control system 130 provides the message as an SMS text message, although other types of messages and delivery techniques are also possible.

Advantageously, out-of-sector wireless communication device 103 can request to receive the message stream that is broadcast to sector 155 when device 103 is located in a different sector 165. Further, by providing the interest filter criteria in the request, out-of-sector wireless communication device 103 will not receive information being broadcast in the message stream until a requisite level of interest in the information has been generated as determined by the interest indicator received by communication control system 130. In this manner, a user of out-of-sector wireless communication device 103 can stay updated on information local to the area served by sector 155 that is of interest to the wireless communication devices 101-102 located in sector 155, even when device 103 is remotely located in a different sector 165.

Referring back to FIG. 1, wireless communication devices 101-103 individually comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication devices 101-103 may also include a user interface, memory system, software, processing circuitry, or some other communication components. For example, wireless communication devices 101-103 could each comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication devices 101-103 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication devices 101-103 and a wireless access node 110 or 140.

Wireless access nodes 110 and 140 individually comprise RF communication circuitry and an antenna. The RF communication circuitry typically includes an amplifier, filter, RF modulator, and signal processing circuitry. Wireless access nodes 110 and 140 may also comprise a router, server, memory device, software, processing circuitry, cabling, power supply, network communication interface, structural support, or some other communication apparatus. Wireless access nodes 110 and 140 could each comprise a base station, Internet access node, telephony service node, wireless data access point, or some other wireless communication system—including combinations thereof. Some examples of wireless access nodes 110 and 140 include a base transceiver station (BTS), base station controller (BSC), radio base station (RBS), Node B, enhanced Node B (eNodeB), and others—including combinations thereof. Wireless network protocols that may be utilized by wireless access nodes 110 and 140 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 120 comprises the core network of a wireless communication service provider, and could include routers, gateways, telecommunication switches, servers, processing systems, or other communication equipment and systems for providing communication and data services. Communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 120 may be configured to communicate over metallic, wireless, or optical links—including combinations thereof. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to many wireless communication devices across a large geographic region.

Communication control system 130 comprises a processing system and communication transceiver. Communication control system 130 may also include other components such as a router, server, data storage system, and power supply. Communication control system 130 may reside in a single device or may be distributed across multiple devices. Communication control system 130 may be a discrete system or may be integrated within other systems—including other systems within communication system 100. In some examples, communication control system 130 could comprise a network switch, mobile switching center, router, switching system, packet gateway, network gateway system, Internet access node, application server, service node, firewall, or some other communication system—including combinations thereof.

Wireless communication links 111-113 use the air or space as the transport medium. Wireless communication links 111-113 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication links 111-113 may individually comprise many different signals sharing the same link. For example, wireless communication links 111-113 could include multiple signals operating in a single propagation path comprising multiple communication sessions, frequencies, timeslots, transportation ports, logical transportation links, network sockets, IP sockets, packets, or communication directions—including combinations thereof.

Communication links 121, 131, and 141 use metal, air, space, optical fiber such as glass or plastic, or some other material as the transport medium—including combinations thereof. Communication links 121, 131, and 141 could use various communication protocols, such as TDM, IP, Ethernet, telephony, optical networking, hybrid fiber coax (HFC), communication signaling, wireless protocols, or some other communication format—including combinations thereof. Communication links 121, 131, and 141 may be direct links or could include intermediate networks, systems, or devices.

Figure 3:
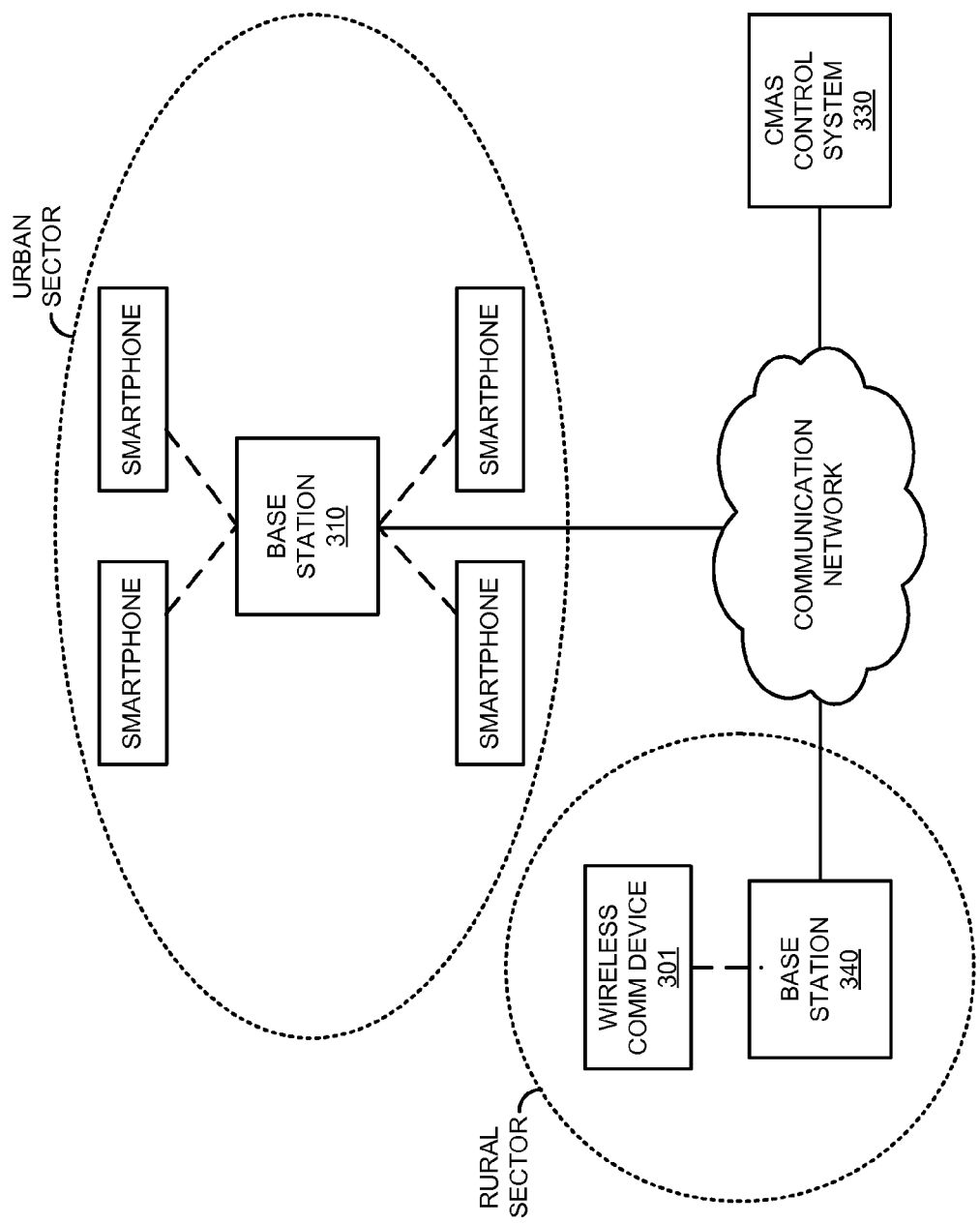
FIG. 3 is a block diagram that illustrates a communication system in an exemplary embodiment.

FIG. 3 is a block diagram that illustrates communication system 300 in an exemplary embodiment. Communication system 300 includes wireless communication device 301, base stations 310 and 340, and commercial mobile alert system (CMAS) control system 330. Base station 310 provides an example of wireless access node 110 and CMAS control system 330 provides an example of communication control system 130, although node 110 and system 130 may use alternative configurations. Each of the base stations 310 and 340 has approximate wireless coverage areas as indicated by the dotted lines on FIG. 3. In particular, base station 310 provides a wireless coverage area designated as an urban sector for serving a plurality of smartphones in communication with base station 310. Base station 340 provides a wireless coverage area to wireless communication device 301 designated as a rural sector in FIG. 3. The urban sector served by base station 310 and the rural sector served by base station 340 do not overlap in this example and cover separate and distinct geographical areas.

In FIG. 3, CMAS control system 330 is configured to control the dissemination of emergency notifications and alerts via SMS text messages to mobile communication devices that are located in an area affected by an emergency. For example, if a tornado threatens to enter the urban sector served by base station 310, CMAS control system 330 could direct base station 310 to issue an SMS tornado warning to the smartphones within the urban sector. Base station 310 has a dedicated communication channel that is reserved for broadcasting these emergency notifications as directed by CMAS control system 330. However, at times when no emergency is occurring, this broadcast channel may used to provide other types of localized information to devices within a sector, such as news, weather, traffic, sports, retail promotions, and other messages that are related to the location covered by the sector. In some cases, a user of a wireless communication device 301 that is not located in the urban sector may still want to receive some of these messages that are being broadcast to the smartphones within the urban sector. The following description of FIGS. 4 and 5 provide two examples of techniques for delivering message content to wireless communication device 301 related to a message stream being broadcast to the smartphones within the urban sector when device 301 is located in the rural sector of FIG. 3.

Figure 4:
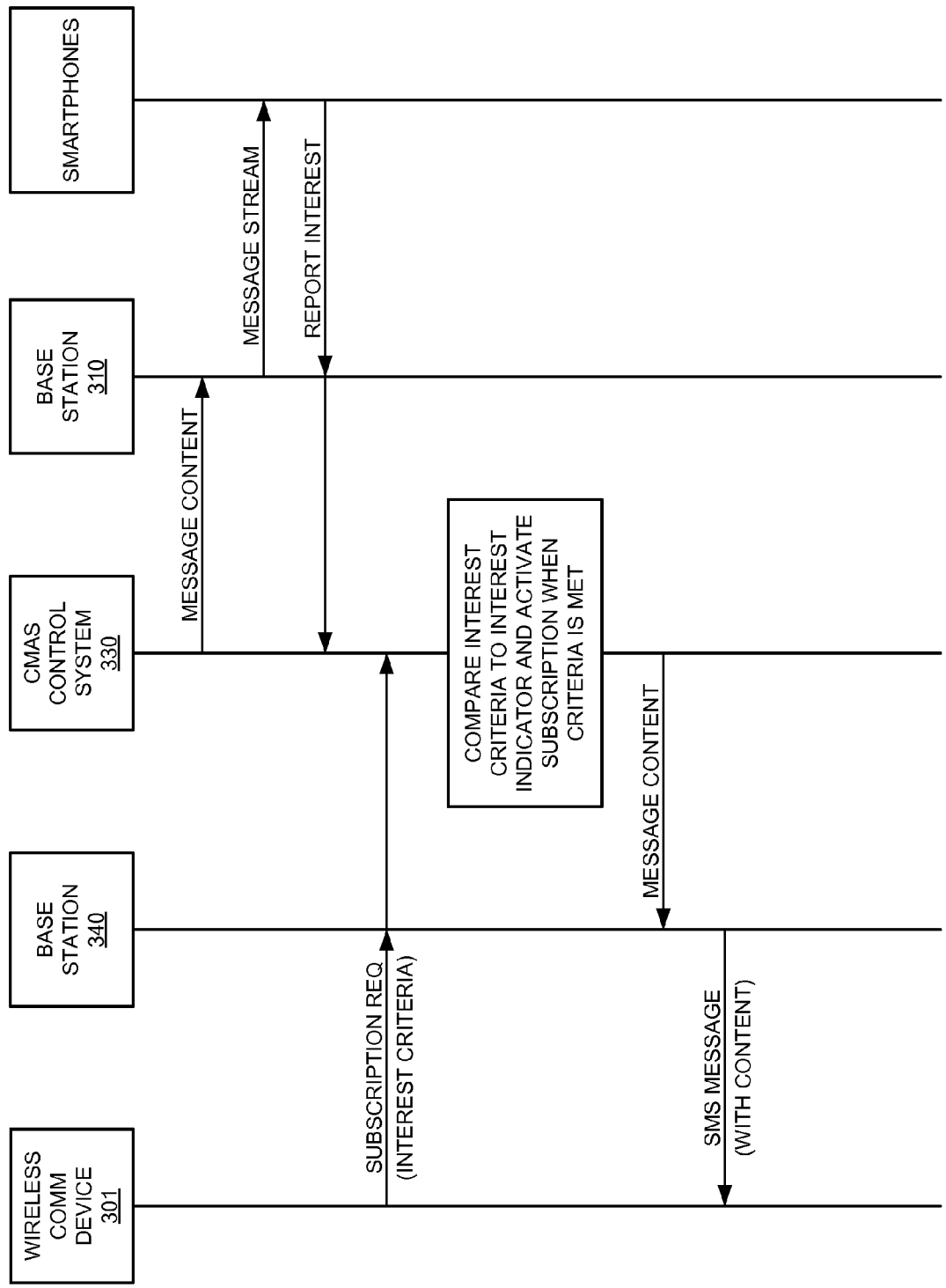
FIG. 4 is a sequence diagram that illustrates an operation of the communication system in an exemplary embodiment.
Figure 5:
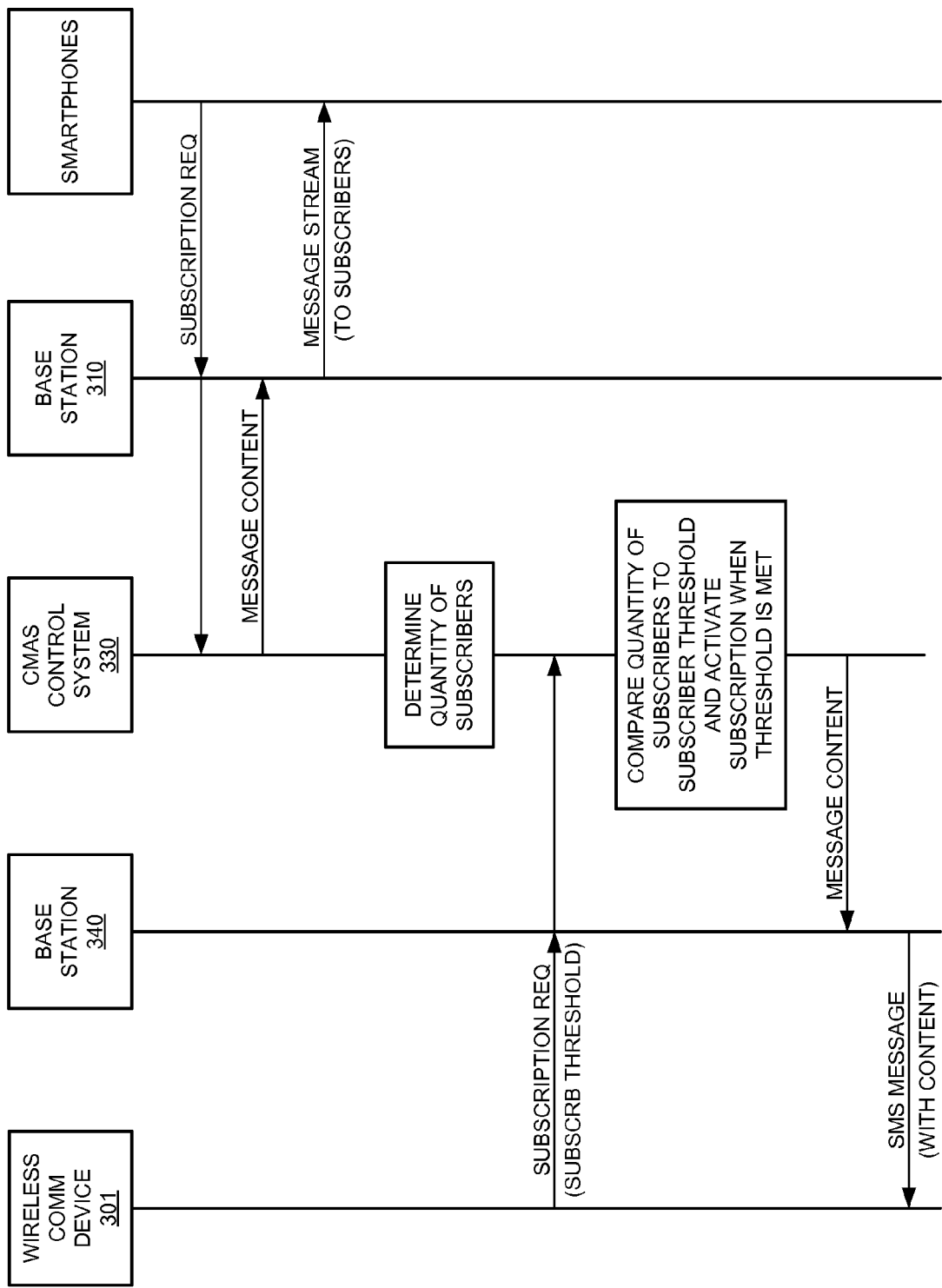
FIG. 5 is a sequence diagram that illustrates an operation of the communication system in an exemplary embodiment.

FIG. 4 is a sequence diagram that illustrates an operation of communication system 300 in an exemplary embodiment. Initially, CMAS control system 330 provides message content to base station 310 and instructs base station 310 to broadcast the content to the smartphones located in the urban sector it serves. CMAS control system 330 would typically receive the message content from news or weather servers, participating retail establishments, or other message systems. Base station 310 then broadcasts the message content in a message stream to the smartphones in the urban sector.

In this example, base station 310 broadcasts the message stream indiscriminately to all of the smartphones served by base station 310 in the urban sector in a similar manner to broadcasting emergency notifications. However, the message stream for the non-emergency content contains a flag or indicator bit to inform the smartphones that the message stream in this case is not an emergency broadcast. The smartphones therefore receive and cache the message content but are not configured to display the non-emergency content by default.

Instead, a smartphone user may access a menu or listing of the received content that provides a description of each of the messages of the message stream, and the phone will only display a particular message when the user selects that message for display. In some examples, the user may provide predetermined authorizations to display particular types of messages or messages from certain content providers or entities.

When a user selects a message for display, the user's smartphone is configured to report this selection to CMAS control system 330. The smartphones report these interest indicators to inform CMAS control system 330 that the user of the smartphone was interested in the message and selected the message for display. In some examples, the user may also provide a rating of the message content, such as like/dislike, a numerical rating on a scale of one to five, or some other metric, and this user feedback could also be transferred by the smartphones to CMAS control system 330 as part of the interest indicator.

While located in the rural sector of FIG. 3, wireless communication device 301 transfers a subscription request to CMAS control system 330 requesting to receive a particular message or messages from the message stream being broadcast to the smartphones in the urban sector. For example, the user of wireless communication device 301 may commute to the location served by the urban sector on a daily basis and thus desires to stay informed of weather updates pertaining to the urban location. However, the user does not wish to receive every weather update, but only updates that are of significant interest to users of the smartphones within the urban sector. Therefore, the subscription request to receive the weather updates includes interest filter criteria to instruct CMAS control system 330 to only transfer weather updates that a majority of the urban-sector smartphones receiving the broadcast message stream have chosen to display or otherwise reported as interesting. For example, a weather update advising of a severe winter snow storm might be displayed more frequently by the smartphones in the urban sector than a less eventful weather pattern.

CMAS control system 330 therefore compares the interest indicators received from the urban-sector smartphones to the interest filter criteria received in the subscription request from the rural-sector wireless communication device 301. In this case, a majority of the smartphones have indicated an interest in a recent weather update, so the interest filter criteria is met. CMAS control system 330 thus transfers message content comprising an SMS text message of the interesting weather update for delivery to wireless communication device 301 within the rural sector. Base station 340 that serves the rural sector receives the SMS text message via a communication network and transmits the message to wireless communication device 301. In this manner, the user of wireless communication device 301 is informed of an impending snow storm that will impact the location served by the urban sector, even when device 301 is not located in the urban sector and is therefore not privy to the initial broadcast of this information in the message stream.

FIG. 5 is a sequence diagram that illustrates an operation of communication system 300 in an exemplary embodiment. The operation of FIG. 5 is similar to the operation of FIG. 4, except that in FIG. 5, the smartphones located in the urban sector must actively subscribe to message content in order to receive messages in the broadcast message stream. The operation of FIG. 5 thus begins with the smartphones transmitting subscription requests for particular messages for delivery to CMAS control system 330 by way of SMS short codes. In this example, a new retail establishment has opened in the location served by the urban sector and has offered a discount promotion for the first one hundred users that subscribe to their message stream. CMAS control system 330 maintains a data structure of device identifiers of the smartphones that have subscribed to the retail establishment's message stream, and provides these identifiers to base station 310 along with the message content. Base station 310 broadcasts the message stream to the subscribers by including the device identifiers of the subscribers in the overhead of the broadcast. The subscribing smartphones are configured to identify their respective device identifiers in the message stream and responsively receive and display the messages based on these identifiers.

After receiving the subscription requests, CMAS control system 330 determines a quantity of subscribers that have subscribed to the message stream of the retail establishment. Wireless communication device 301 transfers a subscription request to CMAS control system 330 to subscribe to the message stream of the retail establishment. However, since wireless communication device 301 is located in the rural sector of FIG. 3 and not the urban sector, device 301 will not receive the broadcast message stream from base station 310. The subscription request from wireless communication device 301 includes a subscription threshold requiring that three devices in the urban sector subscribe to the broadcast message stream before the subscription to the message stream for device 301 is activated. CMAS control system 330 compares the quantity of subscribers to the broadcast message stream to the subscriber threshold of three devices, which in this case is met since all four smartphones within the urban sector have subscribed to the message stream of the retail establishment to take advantage of the promotion. Thus, CMAS control system 330 activates the subscription to the message stream for wireless communication device 301.

CMAS control system 330 generates an SMS text message for wireless communication device 301 that includes the advertising content provided by the retail establishment and transfers the message for delivery to wireless communication device 301. Base station 340 receives the SMS text message via a communication network and wirelessly transmits the message to wireless communication device 301. In this manner, wireless communication device 301 is able to subscribe to the message stream of the retail establishment as one of the first one hundred subscribers in fulfillment of the terms of the promotional offer, and therefore avoids missing out on the promotion, despite being located in the rural sector.

Figure 6:
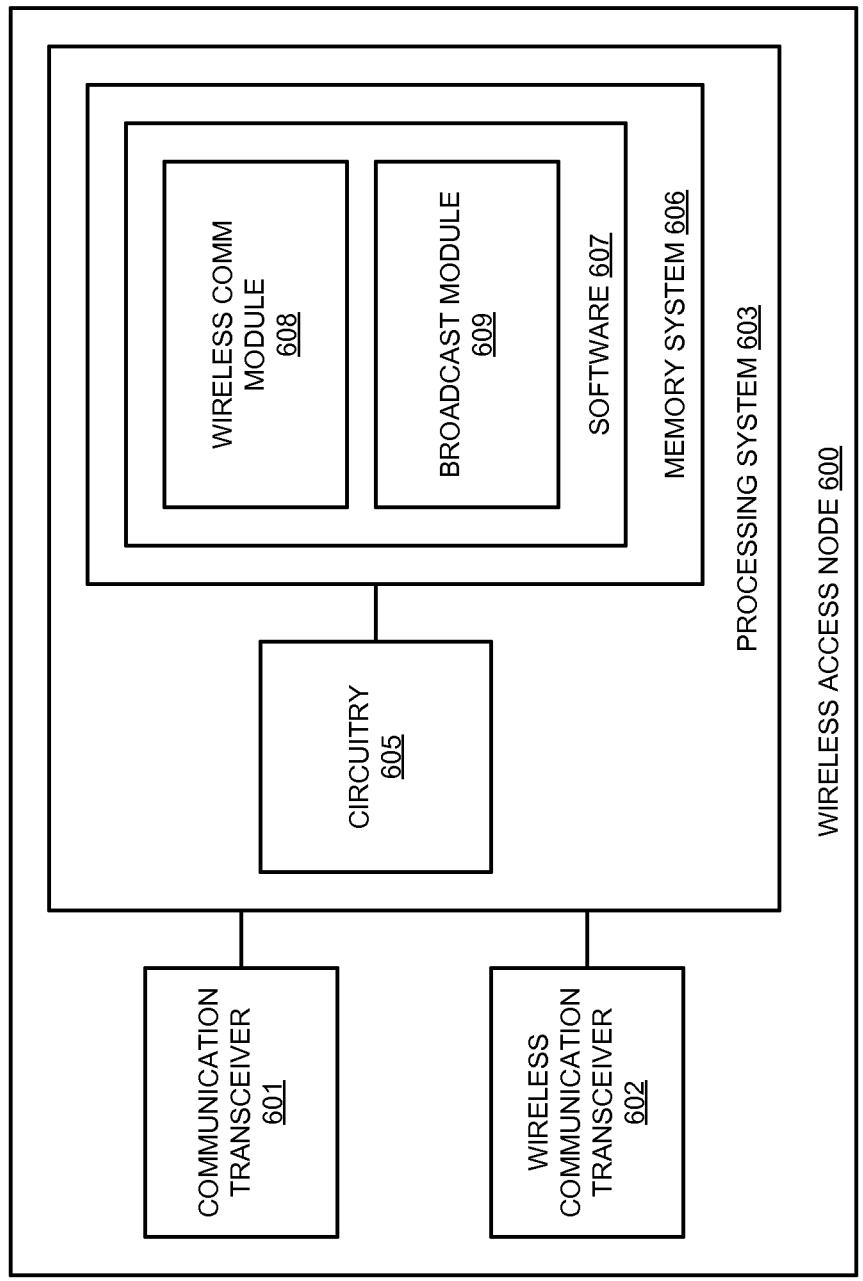
FIG. 6 is a block diagram that illustrates a wireless access node.

FIG. 6 is a block diagram that illustrates wireless access node 600. Wireless access node 600 provides an example of wireless access node 110, although node 110 may use alternative configurations. Wireless access node 600 comprises communication transceiver 601, wireless communication transceiver 602, and processing system 603. Processing system 603 is linked to communication transceiver 601 and wireless communication transceiver 602. Processing system 603 includes processing circuitry 605 and memory system 606 that stores operating software 607. Operating software 607 comprises software modules 608 and 609.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof.

Wireless communication transceiver 602 comprises RF communication circuitry and an antenna. The RF communication circuitry typically includes an amplifier, filter, RF modulator, and signal processing circuitry. Wireless communication transceiver 602 may also include a memory system, software, processing circuitry, or some other communication device. Wireless communication transceiver 602 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other wireless communication format. Wireless communication transceiver 602 is configured to exchange wireless communications with a plurality of wireless communication devices located in a sector served by wireless access node 600 to provide wireless internet access. Further, wireless communication transceiver 602 is configured to broadcast a message stream to the wireless communication devices located in the sector.

Processing circuitry 605 comprises microprocessor and other circuitry that retrieves and executes operating software 607 from memory system 606. Processing circuitry 605 may comprise a single device or could be distributed across multiple devices—including devices in different geographic areas. Processing circuitry 605 may be embedded in various types of equipment. Memory system 606 comprises a non-transitory computer readable storage medium, such as a disk drive, flash drive, data storage circuitry, or some other hardware memory apparatus. Memory system 606 may comprise a single device or could be distributed across multiple devices—including devices in different geographic areas. Memory system 606 may be embedded in various types of equipment. Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608 and 609, although software 607 could have alternative configurations in other examples.

When executed by circuitry 605, operating software 607 directs processing system 603 to operate as described herein for wireless access node 110. In particular, operating software 607 directs processing system 603 to direct wireless communication transceiver 602 to exchange wireless communications with a plurality of wireless communication devices located in a sector served by wireless access node 600 to provide wireless internet access. Further, operating software 607 directs processing system 603 to direct wireless communication transceiver 602 to broadcast a message stream to the wireless communication devices located in the sector.

In this example, operating software 607 comprises a wireless communication software module 608 that exchanges wireless communications with a plurality of wireless communication devices located in a sector served by wireless access node 600 to provide wireless internet access. Operating software 607 also comprises a broadcast software module 609 that broadcasts a message stream to the wireless communication devices located in the sector.

Figure 7:
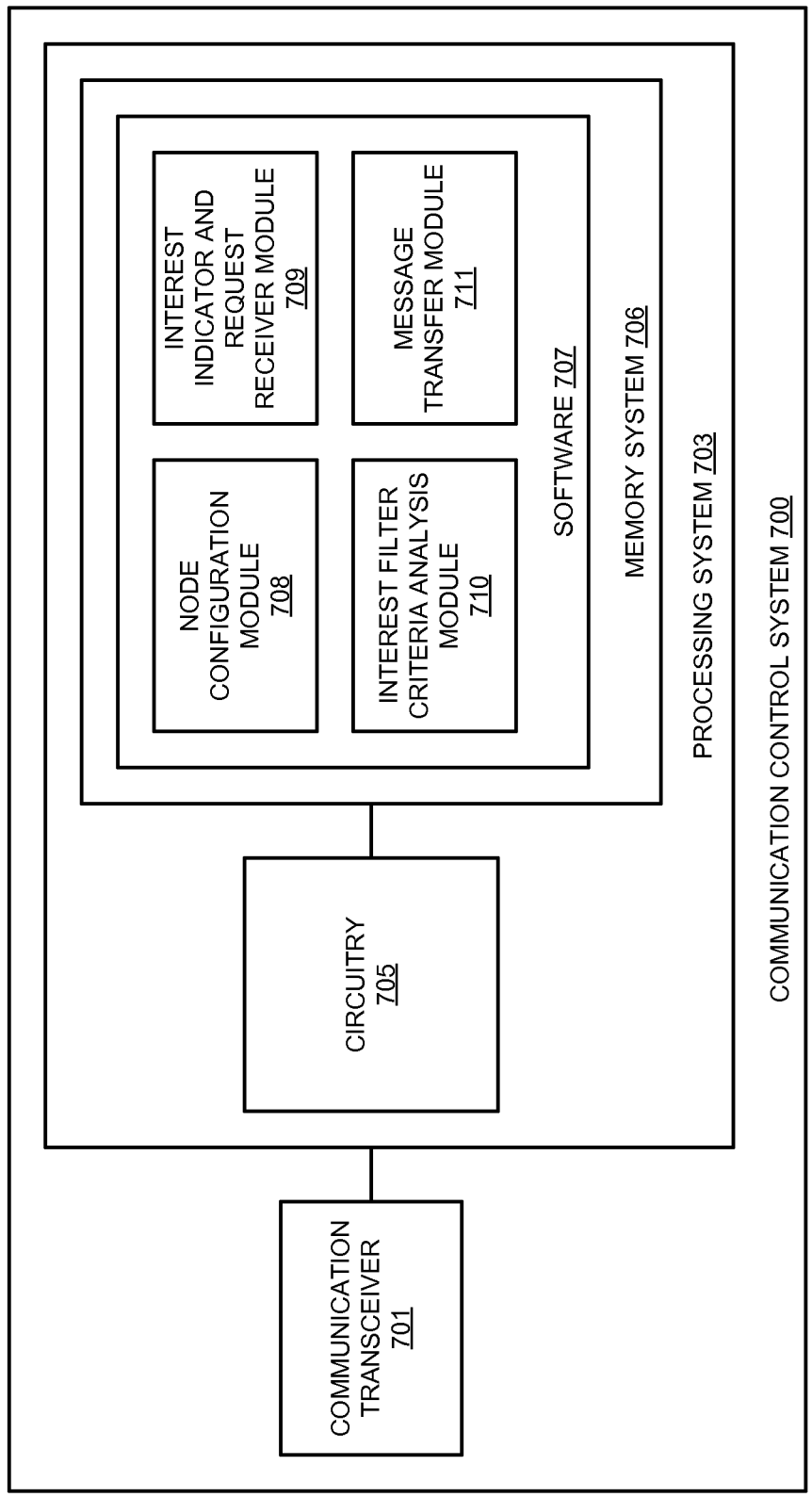
FIG. 7 is a block diagram that illustrates a communication control system.

FIG. 7 is a block diagram that illustrates communication control system 700. Communication control system 700 provides an example of communication control system 130, although system 130 may use alternative configurations. Communication control system 700 comprises communication transceiver 701 and processing system 703. Processing system 703 is linked to communication transceiver 701. Processing system 703 includes processing circuitry 705 and memory system 706 that stores operating software 707. Operating software 707 comprises software modules 708-711.

Communication transceiver 701 comprises components that communicate over communication links, such as network cards, ports, RF transceivers, processing circuitry and software, or some other communication components. Communication transceiver 701 may be configured to communicate over metallic, wireless, or optical links. Communication transceiver 701 may be configured to use TDM, IP, Ethernet, optical networking, wireless protocols, communication signaling, or some other communication format—including combinations thereof. Communication transceiver 701 may be configured to receive an interest indicator that indicates a level of interest in a message stream by a plurality of wireless communication devices, and to receive a request to receive the message stream transmitted from an out-of-sector wireless communication device served by a different sector from a sector serving the wireless communication devices, wherein the request includes interest filter criteria. Further, communication transceiver 701 may be configured to transfer a message for delivery to the out-of-sector wireless communication device in response to activating a subscription to the message stream, wherein the message comprises information associated with a location covered by the sector serving the wireless communication devices.

Processing circuitry 705 comprises microprocessor and other circuitry that retrieves and executes operating software 707 from memory system 706. Processing circuitry 705 may comprise a single device or could be distributed across multiple devices—including devices in different geographic areas. Processing circuitry 705 may be embedded in various types of equipment. Memory system 706 comprises a non-transitory computer readable storage medium, such as a disk drive, flash drive, data storage circuitry, or some other hardware memory apparatus. Memory system 706 may comprise a single device or could be distributed across multiple devices—including devices in different geographic areas. Memory system 706 may be embedded in various types of equipment. Operating software 707 comprises computer programs, firmware, or some other form of machine-readable processing instructions. Operating software 707 may include an operating system, utilities, drivers, network interfaces, applications, or some other type of software. In this example, operating software 707 comprises software modules 708-711, although software 707 could have alternative configurations in other examples.

When executed by circuitry 705, operating software 707 directs processing system 703 to operate as described herein for communication control system 130. In particular, operating software 707 directs processing system 703 to configure a wireless access node to broadcast a message stream comprising information associated with a location covered by a sector serving a plurality of wireless communication devices. Further, operating software 707 directs processing system 703 to direct communication transceiver 701 to receive an interest indicator that indicates a level of interest in the message stream by the wireless communication devices, and to receive a request to receive the message stream transmitted from an out-of-sector wireless communication device served by a different sector from the sector serving the wireless communication devices, wherein the request includes interest filter criteria. In addition, operating software 707 directs processing system 703 to apply the interest filter criteria to activate a subscription to the message stream for the out-of-sector wireless communication device when the interest filter criteria is met based on the interest indicator. Operating software 707 directs processing system 703 to direct communication transceiver 701 to transfer a message for delivery to the out-of-sector wireless communication device in response to activating the subscription to the message stream, wherein the message comprises the information associated with the location covered by the sector serving the wireless communication devices.

In this example, operating software 707 comprises a node configuration software module 708 that configures a wireless access node to broadcast a message stream comprising information associated with a location covered by a sector serving a plurality of wireless communication devices. In addition, operating software 707 comprises an interest indicator and request receiver software module 709 that receives an interest indicator that indicates a level of interest in the message stream by the wireless communication devices, and that receives a request to receive the message stream transmitted from an out-of-sector wireless communication device served by a different sector from the sector serving the wireless communication devices, wherein the request includes interest filter criteria. Further, operating software 707 comprises an interest filter criteria analysis software module 710 that applies the interest filter criteria to activate a subscription to the message stream for the out-of-sector wireless communication device when the interest filter criteria is met based on the interest indicator. Finally, operating software 707 comprises a message transfer software module 711 that transfers a message for delivery to the out-of-sector wireless communication device in response to activating the subscription to the message stream, wherein the message comprises the information associated with the location covered by the sector serving the wireless communication devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, the method comprising:
   in a wireless access node, exchanging wireless communications with a plurality of wireless communication devices located in a sector served by the wireless access node to provide wireless internet access;
   in a communication control system, configuring the wireless access node to broadcast a message stream comprising information associated with a location covered by the sector serving the wireless communication devices;
   in the wireless access node, broadcasting the message stream to the wireless communication devices located in the sector;
   in the communication control system, receiving an interest indicator that indicates a level of interest in the message stream by the wireless communication devices;
   in the communication control system, receiving a request to receive the message stream transmitted from an out-of-sector wireless communication device served by a different sector from the sector serving the wireless communication devices, wherein the request includes interest filter criteria;
   in the communication control system, applying the interest filter criteria to activate a subscription to the message stream for the out-of-sector wireless communication device when the interest filter criteria is met based on the interest indicator; and
   in the communication control system, in response to activating the subscription to the message stream, transferring a message for delivery to the out-of-sector wireless communication device, wherein the message comprises the information associated with the location covered by the sector serving the wireless communication devices.

2. The method of claim 1 wherein receiving the interest indicator that indicates the level of interest in the message stream by the wireless communication devices comprises receiving usage metrics transmitted from the wireless communication devices that indicate portions of the message stream displayed by the wireless communication devices.

3. The method of claim 1 wherein receiving the interest indicator that indicates the level of interest in the message stream by the wireless communication devices comprises receiving subscription requests transmitted from the wireless communication devices to subscribe to the message stream.

4. The method of claim 3 wherein applying the interest filter criteria to activate the subscription to the message stream for the out-of-sector wireless communication device when the interest filter criteria is met based on the interest indicator comprises determining the interest indicator as a quantity of the subscription requests received from the wireless communication devices, processing the interest indicator with the interest filter criteria to determine that the interest filter criteria is met, and responsively activating the subscription to the message stream for the out-of-sector wireless communication device.

5. The method of claim 1 wherein the interest filter criteria comprises a threshold quantity of the wireless communication devices that are interested in the message stream based on the interest indicator.

6. The method of claim 1 wherein the interest filter criteria comprises a percent growth of the wireless communication devices per day that are interested in the message stream based on the interest indicator.

7. The method of claim 1 wherein the request to receive the message stream includes an information type, and wherein the information included in the message comprises the information type.

8. The method of claim 7 wherein the information type comprises at least one of local news, weather updates, sports results, and advertisements.

9. The method of claim 1 wherein the request to receive the message stream identifies the location covered by the sector serving the wireless communication devices.

10. The method of claim 1 wherein the request to receive the message stream is submitted via an application executing on the out-of-sector wireless communication device.

11. A wireless communication system comprising:
    a wireless access node configured to exchange wireless communications with a plurality of wireless communication devices located in a sector served by the wireless access node to provide wireless internet access; and
    a communication control system configured to configure the wireless access node to broadcast a message stream comprising information associated with a location covered by the sector serving the wireless communication devices;
    the wireless access node configured to broadcast the message stream to the wireless communication devices located in the sector;

the communication control system configured to receive an interest indicator that indicates a level of interest in the message stream by the wireless communication devices;

the communication control system configured to receive a request to receive the message stream transmitted from an out-of-sector wireless communication device served by a different sector from the sector serving the wireless communication devices, wherein the request includes interest filter criteria;

the communication control system configured to apply the interest filter criteria to activate a subscription to the message stream for the out-of-sector wireless communication device when the interest filter criteria is met based on the interest indicator; and the communication control system configured to, in response to activating the subscription to the message stream, transfer a message for delivery to the out-of-sector wireless communication device, wherein the message comprises the information associated with the location covered by the sector serving the wireless communication devices.

12. The wireless communication system of claim 11 wherein the communication control system configured to receive the interest indicator that indicates the level of interest in the message stream by the wireless communication devices comprises the communication control system configured to receive usage metrics transmitted from the wireless communication devices that indicate portions of the message stream displayed by the wireless communication devices.

13. The wireless communication system of claim 11 wherein the communication control system configured to receive the interest indicator that indicates the level of interest in the message stream by the wireless communication devices comprises the communication control system configured to receive subscription requests transmitted from the wireless communication devices to subscribe to the message stream.

14. The wireless communication system of claim 13 wherein the communication control system configured to apply the interest filter criteria to activate the subscription to the message stream for the out-of-sector wireless communication device when the interest filter criteria is met based on the interest indicator comprises the communication control system configured to determine the interest indicator as a quantity of the subscription requests received from the wireless communication devices, process the interest indicator with the interest filter criteria to determine that the interest filter criteria is met, and responsively activate the subscription to the message stream for the out-of-sector wireless communication device.

15. The wireless communication system of claim 11 wherein the interest filter criteria comprises a threshold quantity of the wireless communication devices that are interested in the message stream based on the interest indicator.

16. The wireless communication system of claim 11 wherein the interest filter criteria comprises a percent growth of the wireless communication devices per day that are interested in the message stream based on the interest indicator.

17. The wireless communication system of claim 11 wherein the request to receive the message stream includes an information type, and wherein the information included in the message comprises the information type.

18. The wireless communication system of claim 17 wherein the information type comprises at least one of local news, weather updates, sports results, and advertisements.

19. The wireless communication system of claim 11 wherein the request to receive the message stream identifies the location covered by the sector serving the wireless communication devices.

20. A communication control system, wherein a wireless access node is configured to exchange wireless communications with a plurality of wireless communication devices located in a sector served by the wireless access node to provide wireless internet access, the communication control system comprising:

a processing system configured to configure the wireless access node to broadcast a message stream comprising information associated with a location covered by the sector serving the wireless communication devices; and a communication transceiver configured to transfer the message stream for delivery to the wireless access node, receive an interest indicator that indicates a level of interest in the message stream by the wireless communication devices, and to receive a request to receive the message stream transmitted from an out-of-sector wireless communication device served by a different sector from the sector serving the wireless communication devices, wherein the request includes interest filter criteria;

the processing system configured to apply the interest filter criteria to activate a subscription to the message stream for the out-of-sector wireless communication device when the interest filter criteria is met based on the interest indicator; and the communication transceiver configured to, in response to activating the subscription to the message stream, transfer a message for delivery to the out-of-sector wireless communication device, wherein the message comprises the information associated with the location covered by the sector serving the wireless communication devices.

* * * * *